United States Patent
Seppä

(10) Patent No.: US 7,760,152 B2
(45) Date of Patent: Jul. 20, 2010

(54) ANTENNA SYSTEM AND A METHOD IN CONNECTION WITH AN ANTENNA

(75) Inventor: Hekki Seppä, Helsinki (FI)

(73) Assignee: Perlos Oyj, Vantaa (FI)

( * ) Notice: Subject to any disclaimer, the term of this patent is extended or adjusted under 35 U.S.C. 154(b) by 278 days.

(21) Appl. No.: 11/887,238

(22) PCT Filed: Mar. 28, 2006

(86) PCT No.: PCT/FI2006/000096

§ 371 (c)(1),
(2), (4) Date: Jan. 15, 2008

(87) PCT Pub. No.: WO2006/103311

PCT Pub. Date: Oct. 5, 2006

(65) Prior Publication Data

US 2009/0289862 A1  Nov. 26, 2009

(30) Foreign Application Priority Data

Mar. 29, 2005 (FI) .................................. 20050327

(51) Int. Cl.
*H01Q 9/00* (2006.01)
*H01Q 3/24* (2006.01)
(52) U.S. Cl. ....................... 343/745; 343/876
(58) Field of Classification Search .......... 343/700 MS, 343/702, 876, 745
See application file for complete search history.

(56) References Cited

U.S. PATENT DOCUMENTS

| 5,969,681 | A | * | 10/1999 | O'Neill, Jr. | ........... 343/700 MS |
| 6,061,025 | A | | 5/2000 | Jackson et al. | |
| 6,140,966 | A | * | 10/2000 | Pankinaho | ........... 343/700 MS |
| 6,218,989 | B1 | * | 4/2001 | Schneider et al. | ..... 343/700 MS |
| 6,662,028 | B1 | | 12/2003 | Hayes et al. | |
| 6,934,557 | B2 | * | 8/2005 | Sekine et al. | ............ 455/550.1 |
| 2002/0180650 | A1 | | 12/2002 | Pankinaho et al. | |

FOREIGN PATENT DOCUMENTS

| EP | 1 498 984 A1 | 1/2005 |
| FI | 11-3212 B | 1/1999 |
| FI | 11-4260 B | 5/2002 |
| FI | 11-3813 B | 10/2002 |

* cited by examiner

*Primary Examiner*—Shih-Chao Chen
(74) *Attorney, Agent, or Firm*—Birch, Stewart, Kolasch & Birch, LLP

(57) ABSTRACT

The invention relates to an antenna system that includes transmitter component (1, 2, 3, 4), a reception component (4, 3, 10, 11, 12), and an antenna (5) connected to the transmitter and reception components. According to the invention, the antenna (5) is arranged to connect to different connection points (6, 7, 8) of the transmitter (1, 2, 3, 4) or the reception component (4, 3, 10, 11, 12). The invention is also related to a method in connection with the antenna.

16 Claims, 2 Drawing Sheets

ANTENNA SYSTEM AND A METHOD IN CONNECTION WITH AN ANTENNA

FIELD OF THE INVENTION

The present invention relates to an antenna system and method in connection with an antenna. Particularly, the antenna is arranged to connect to different connection points of a transmitter or a reception component.

BACKGROUND OF THE INVENTION

The antennas of mobile telephones are typically made to be broadband and 50-Ohm. Power regulation is made by varying the output voltage of the output stage. The amplifier is also often 50-Ohm, in which case most of the loss of power is in the loss from the output stage. If the amplifier can be made low-impedance and the operating voltage can be regulated, a considerable saving in power will be obtained, at least at high power levels. Due to the aforementioned adaptation, this is not, however, done. Especially in mobile telephones, all excess power consumption is bad, as it reduces the operating time of the telephone's battery.

Broadband antennas require expensive bandpass filters, typically implemented using SAW technology, which increase the total cost of the electronics.

SUMMARY OF THE INVENTION

The aim of the present invention is to eliminate the defects of the prior art and for this purpose create an entirely new type of system, method, and antenna.

The invention is based on the antenna being equipped with several feed points, in order to vary its impedance. For example, the transmission power is then selected by altering the feed point of the antenna, and thus its impedance, always according to the power requirement. The output amplifier is then made with the lowest possible impedance, in order to minimize power consumption. In one preferred embodiment of the invention, the antenna is implemented as narrowband, and with a high quality factor.

In a second preferred embodiment of the invention, the antenna is equipped with a variable capacitance, in order to tune it.

More specifically, the antenna system according to the present invention includes a transmitter component, a reception component, and an antenna connected to the transmitter component and the reception component. The antenna is arranged to connect to different connection points of the transmitter or the reception component.

According to an aspect of the present invention, a method in connection with an antenna is disclosed in which method electrical power is fed to the antenna, the radiation power produced by the antenna is regulated, wherein the radiation power produced by the antenna is regulated by altering the electrical-power connection point in the antenna.

According to a further aspect of the present invention, a method in connection with an antenna is disclosed in which method electrical power is received from the antenna, the noise of the a receiver is minimized, wherein the noise of the receiver is minimized by altering the electrical-power connection point in the antenna.

Further, according to an aspect of the present invention, an antenna includes a conducting surface, a connection point formed on the conducting surface, and a signal-feed conductor connected to the connection point, wherein several connection points, which can be selected one at a time as the connection point of the antenna, are arranged on the conducting surface.

Considerable advantages are gained with the aid of the invention.

By means of the solution according to the invention, the power consumption of equipment such as a mobile telephone can be reduced and the operating time of battery-operated equipment can be significantly increased. In addition, in this way it is also possible to make the antenna more efficient and to reduce power consumption. A narrowband antenna can be made tuneable. At its best, the narrow bandwidth of the antenna will permit expensive bandpass filters to be eliminated, which will reduce particularly the manufacturing costs of mobile stations. By means of the solution according to the invention, in the best case the entire radio-frequency part of a mobile telephone can be integrated in the immediate vicinity of the antenna, possibly inside it. The invention can also be used for the noise-optimization of the reception side.

BRIEF DESCRIPTION OF THE DRAWINGS

In the following, the invention is examined with the aid of examples of embodiments according to the accompanying drawings.

DETAILED DESCRIPTION

Figure 1:
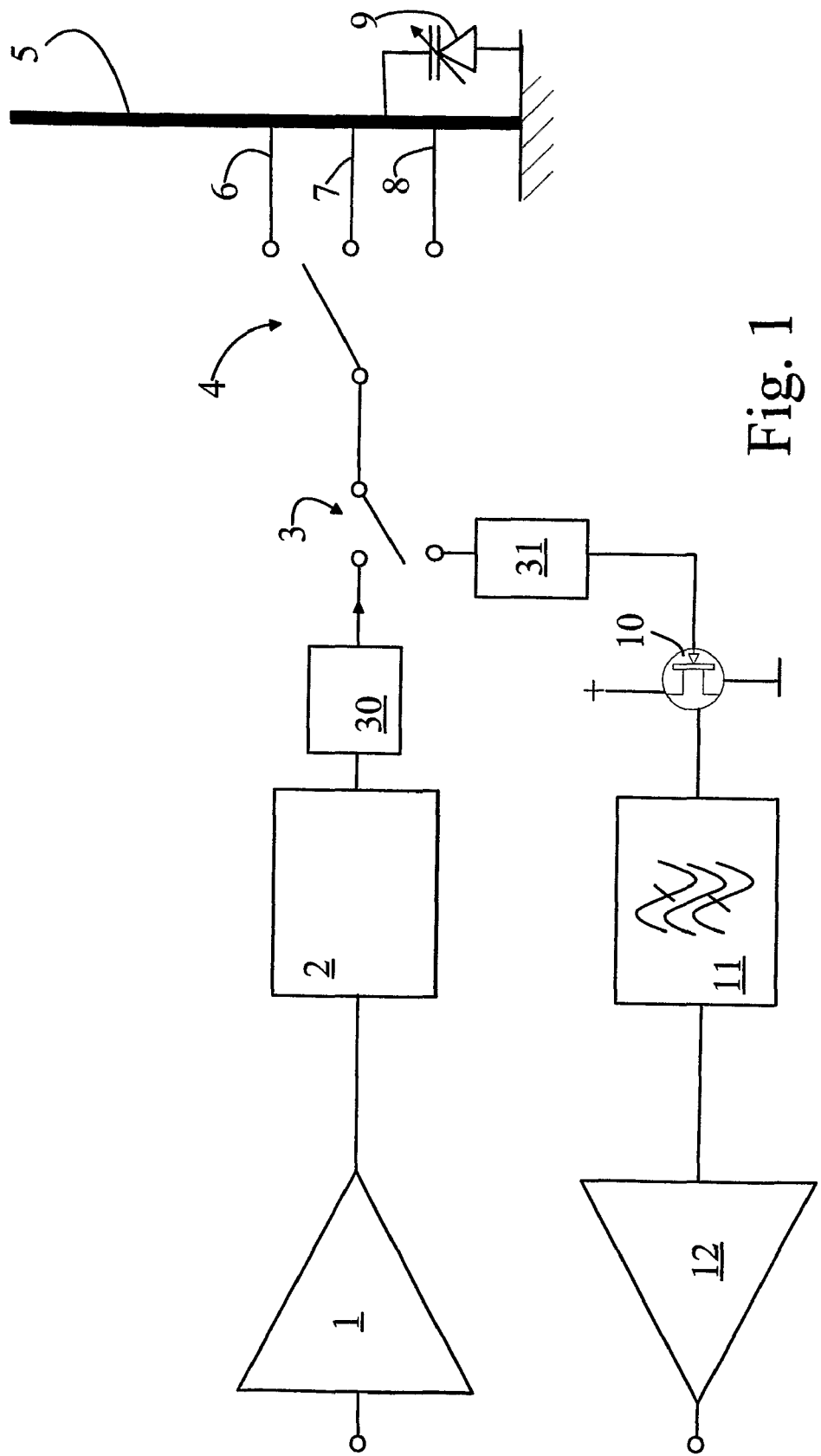
FIG. 1 shows one antenna system according to the invention.

FIG. 1 shows a simple scheme of a mobile telephone's output stage 1, an antenna 5, and a pre-amplifier 12. To allow the antenna's 5 impedance to be made real, it is advantageous to place a variable capacitor 9 in parallel with the antenna 5. This also permits the antenna to be fine tuned when the impedance changes. The same circuit can also be used to adapt the antenna to changes in the environment. In order to know the power fed to the antenna, both the current and the voltage must be measured. If calibration has been performed carefully, measurement of only the voltage and current phase will be sufficient, in order to determine whether the antenna is tuned to the frequency in question. Because, in the solution in question, it is advantageous to construct the antenna to be narrowband, it will also act as a filter at the same time. In that case, the filter circuit 11 of the reception side will be implemented as an LC bandpass filter and there will be no need to implement the filter according to the prior art using expensive SAW (Surface Acoustic Wave) technology. Similarly, LC technology can be used in the transmitter-side impedance converter 2.

In order to regulate power, the antenna 5 is fed from different feed points 6, 7, and 8. In practice, at a low power requirement the upper connection point 6 is used and, as the power requirement increases, the switch 4 is used to move towards a lower antenna impedance. The maximum transmission power is achieved at the connection point 8. By using the implementation according to the invention the transmitter-receiver switch (TR switch) according to the prior art can be eliminated.

In the invention, it is also advantageous to exploit the antenna's different connection points 6, 7, and 8 in the noise optimization of the pre-amplifier 12. The optimum impedance of the pre-amplifier 12 depends on the frequency. This applies particularly to pre-amplifiers of the FET (Field Effect Transistor) type. If a 50-Ohm antenna is used, the pre-amplifier must be selected in such a way that its optimum coincides with 50 Ohm. Another alternative is to make a fixed impedance conversion. If we optimize the pre-amplifier 12 for different frequencies, we will have to make variable impedance conversion between the antenna 5 and the pre-amplifier 12. In the method according to the invention, we can use the switch 4 for impedance conversion of the antenna 5, as shown in FIG. 1. With the aid of the switch 3, it is also possible to eliminate the RT (Receive-Transmit) switch according to the prior art, which when implemented using the prior art is an expensive component.

The control of the switches 3 and 4 takes place electrically. In the control of the switch 4, it is possible to use either the measurement of the power input to the antenna, as described above, or alternatively the apparent power of the mobile-telephone base station, which according to the mobile-station protocol is transmitted to the mobile station.

FIG. 1 shows an impedance matcher 2 and a bandpass filter 11. In theory, the bandpass filter 11 can be eliminated by using a sufficiently narrowband antenna 5 and a variable capacitance 9 connected to it, but in practice a filter 11 is required, though it can be implemented as an advantageous LC filter.

In the reception branch, simple pre-amplification can be implemented in connection with a narrowband antenna, for example, with the aid of a transistor 10. The transistor is preferably of the FET (Field Effect Transistor) type. On the reception side, an impedance matcher 31, which can be either fixed or variable, may also be needed.

The most preferred solution consists of only an antenna 5, which is fed from different points 6-8, by using a switch 4, which can be, for example, an electro-micromechanical so-called MEMS switch. The connection of the switch 4 to the antenna 5 can be galvanic or capacitive. The second switch 3 implemented using the same technology is used to select either transmission or reception. A variable capacitance 9, which can be a varactor or a MEMS capacitance, can be used for the real regulation of the antenna's 5 impedance. The same switches 3 and 4 and variable capacitance 9 can be used in reception. In reception, the switches 3 and 4 are used to noise-optimize the pre-amplifier 12 and the antenna's 5 impedance is kept real by using the variable capacitance 9. After the switch 3 on the reception side, an impedance matcher 31 can be added and, if needed, a first amplifier stage 10 before the filter 11. The first amplifier stage can be, for example, an FET transistor. If the quality factor of the antenna 5 is made extremely large and, at the same time, narrowband, the filter 11 can be implemented as an advantageous LC bandpass filter. The solution in question requires, however, a pre-amplifier that is as linear as possible, and a mixer stage. In the case of an implementation of this kind, the quality factor should be at least 10, preferably in the range 10-100, whereas in the prior art the quality factors of the antennas of mobile telephones are typically less than 10. In that case, the bandwidth $\Delta f$ of the antenna would be, for example, in the order of 9-90 MHz at the 900-MHz GSM frequency.

It is best to integrate the output stage 1, the pre-amplifier 21, the switches 3 and 4, and the variable capacitance 9 together with the antenna 5 in, for example, an LTCC case.

It can also be worthwhile bringing the modulator and demodulator, as well as the control of the switches 3 and 4 and the variable capacitance 9 into the same case. This solution would bring the entire GSM radio component into a single module in the immediate vicinity of the antenna.

Figure 2:
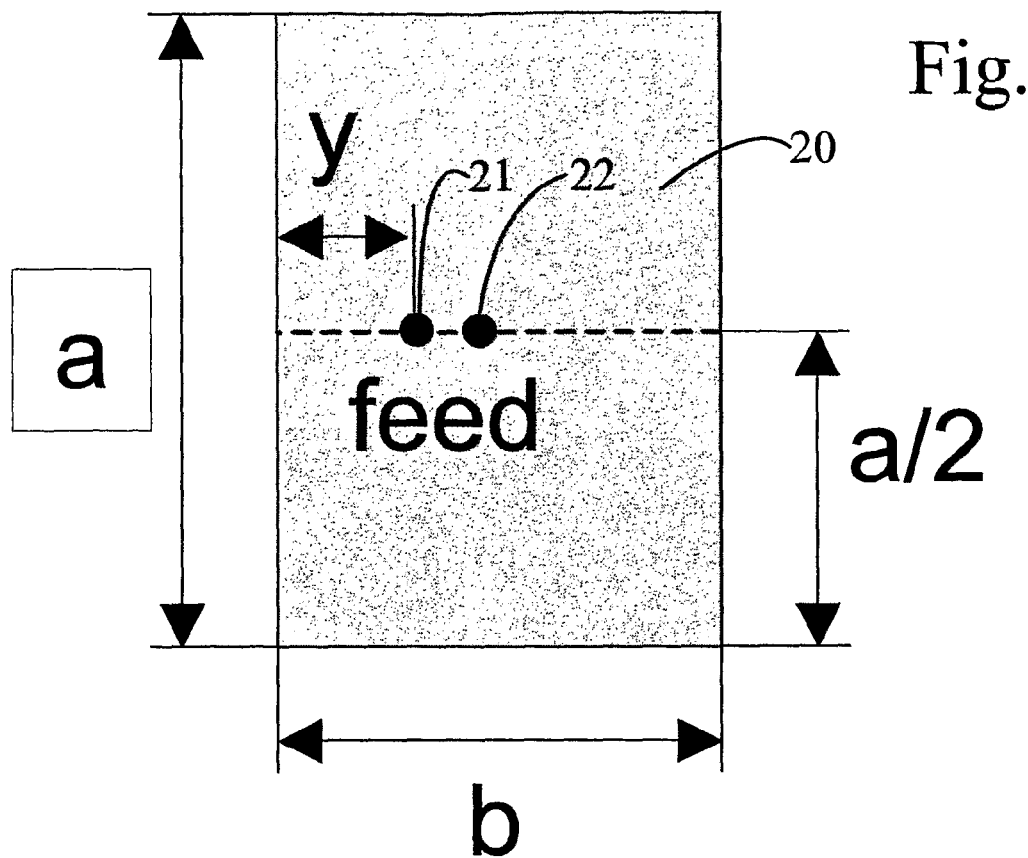
FIG. 2 shows a top view of the antenna according to the invention.

FIG. 2 shows a top view of one example of the implementation of the antenna according to the invention as a so-called PATCH antenna.

The properties of the antenna with the dimensioning shown in the figure are as follows:
Substrate: Rogers RO4003
Dielectric constant of substrate $\in_r = 3.38$
Loss-tangent angle of substrate tan d=0.0027
Thickness of insulation t=1.52 mm
Dimension a=145.8 mm
Dimension b=89.1 mm
Medium frequency f=900 MHz
Bandwidth $\Delta f$=10 MHz
Quality factor Q: $f/\Delta f$=90
Radiation efficiency $\eta$=80%
Impedance: Zant=Rant+j*Xant
  Xant=8 $\Omega$
  y1=34.1 mm=>Rant1=17.5 $\Omega$
  y2=40.6 mm=>Rant2=2.7 $\Omega$
  $\Delta y$=6.5 mm According to the invention, the antenna comprises, on its upper surface 20 at least two input points 21 (y1) and 22 (y2), with the aid of which the input impedance of the antenna can be regulated with the aid of switches.

Figure 3:
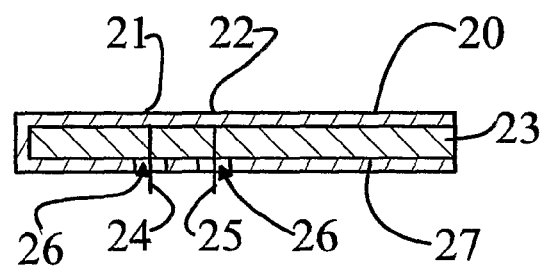
FIG. 3 show a side view of one possible embodiment of the antenna of FIG. 2.

FIG. 3 shows a folder modification of the same antenna, in a cross-section at input points 21 and 22. This is a so-called folded PATCH antenna. The numerical dimensions of FIG. 2 are not applicable to this antenna. The antenna of FIG. 3 is thus implemented as a so-called folder construction, in which there is an upper surface 20 and a ground plane 27, as well as an insulation layer 23 between them. The signal is brought (and taken) from the connection points 21 and 22 through the insulation layer 23 by signal conductors 24 and 25 through vias 26 made in the ground plane, from the output stage or to the pre-amplifier. In one preferred embodiment of the invention, the electronics with its switch is located inside the insulation layer 23.

In the construction according to the invention, one objective is that the antenna should operate temporally in only one mode, in other words in multi-channel telephones the elements of the various modes of the antenna would be connected for operation only if required. By means of this procedure and by using a tuning capacitance the radiation efficiency of the antenna can be improved.

Alternatively, if the impedance of the antenna is kept constant, the impedance can also be varied by using an impedance converter arranged in front of the antenna. The parallel operation of such an impedance converter and the switches 3 and 4 is also possible within the scope of the invention.

The invention claimed is:

1. An antenna system, comprising:
    a transmitter component;
    a reception component; and
    an antenna having a plurality of electrical power connection points for operably connecting said antenna to said transmitter component or said reception component,
    wherein each of said plurality of electrical power connection points allow the antenna to be tuned with different connection impedances.

2. The antenna system according to claim 1, further comprising an electrically variable capacitor connected in parallel with the antenna in order to tune the antenna to different frequencies.

3. The antenna system according to claim 1, further comprising an electrically controllable switch arranged in connection with the antenna, in order to regulate the plurality of electrical power connection points of the antenna.

4. The antenna system according to claim 1, further comprising a power-measuring unit that measures power fed to the antenna.

5. The antenna system according to claim 1, further comprising a power-measuring unit that measures power received from the antenna.

6. A method in connection with an antenna having a plurality of electrical power connection points for operably connecting said antenna to a transmitter component, the method comprising:

feeding electrical power to the antenna; and regulating radiation power produced by the antenna by altering said plurality of electrical power connection points in order to allow the antenna to be tuned with different connection impedances.

7. The method according to claim 6, wherein the radiation power is regulated on the basis of the power fed to the antenna from the transmitter component.

8. The method according to claim 6, wherein the radiation power is regulated on the basis of the power received from the antenna.

9. The method according to claim 6, wherein the antenna is tuned electrically using an electrically variable capacitor connected in parallel to said antenna.

10. The method according to claim 6, wherein the plurality of electrical power connection points is adjusted with the aid of an electrically controllable switch.

11. A method in connection with an antenna having a plurality of electrical power connection points for operably connecting said antenna to a reception component, the method comprising:

receiving electrical power from the antenna; and minimizing noise produced by said reception component by altering said plurality of electrical power connection points in order to allow the antenna to be tuned with different connection impedances.

12. An antenna, comprising:

a conducting surface;

a plurality of electrical power connection points formed on the conducting surface; and a signal-feed conductor connected to one of said plurality of electrical power connection points, wherein each of said plurality of electrical power connection points allow the antenna to be tuned with different connection impedances.

13. The antenna according to claim 12, further comprising an electrically variable capacitor connected in parallel with the antenna.

14. The antenna according to claim 12, further comprising an electrically controllable switch for connecting the signal-feed conductor to one of said plurality of electrical power connection points.

15. The antenna according to claim 12, wherein said antenna is a patch antenna.

16. The antenna according to claim 12, wherein said antenna is a folded patch antenna.

* * * * *